United States Patent [19]

Mitchell

[11] Patent Number: 4,694,604

[45] Date of Patent: Sep. 22, 1987

[54] GAS OR VAPOR DISPERSING APPARATUS

[76] Inventor: Arthur W. Mitchell, Sandyacre, 18 Ballyardle Road, Kilkeel, County Down, Ireland

[21] Appl. No.: 901,999

[22] PCT Filed: Jul. 7, 1981

[86] PCT No.: PCT/GB81/00133

§ 371 Date: Mar. 9, 1982

§ 102(e) Date: Mar. 9, 1982

[87] PCT Pub. No.: WO82/00079

PCT Pub. Date: Jan. 21, 1982

Related U.S. Application Data

[63] Continuation-in-part of Ser. No. 843,878, Mar. 26, 1986, abandoned, which is a continuation of Ser. No. 783,065, Oct. 2, 1985, abandoned, which is a continuation of Ser. No. 359,652, Mar. 9, 1984, abandoned.

[30] Foreign Application Priority Data

Jul. 8, 1980 [GB] United Kingdom ............... 8022349
Mar. 6, 1981 [GB] United Kingdom ............... 8117035

[51] Int. Cl.$^4$ ..................... A01M 1/02; A01M 1/14; A01M 5/06; A01M 13/00
[52] U.S. Cl. ........................ 43/114; 43/107; 43/122
[58] Field of Search ............... 43/107, 114, 118, 122; 239/53–57, 60; 261/104

[56] References Cited

U.S. PATENT DOCUMENTS

| 366,693 | 7/1887 | Sherman | 239/54 |
| 3,855,727 | 12/1974 | Canoy | 43/122 |
| 3,863,384 | 2/1975 | Weatherston | 43/114 |
| 3,866,349 | 2/1975 | Meijer | 43/114 |
| 4,040,568 | 8/1977 | Mason | 239/60 |

Primary Examiner—Nicholas P. Godici
Assistant Examiner—Carmine Cuda
Attorney, Agent, or Firm—Gerald J. Ferguson, Jr.; Michael P. Hoffman; Ronni S. Malamud

[57] ABSTRACT

Apparatus for dispersing a gaseous or vaporized pheromone trail into the atmosphere under determined conditions comprises first container (10) in which a pheromone source (22) is located. Means (12) to create and upward draught is provided surmounting the first container (10). Flying insects lured by the trail enter the means 12 and into the first container (10) then to a second container (9) out of which they cannot escape. Alternatively, the insects land on a sticky insecticide from which they cannot escape.

18 Claims, 5 Drawing Figures

GAS OR VAPOR DISPERSING APPARATUS

This application is a continuation-in-part of Ser. No. 843,878, filed Mar. 26, 1986, now abandoned, which is a continuation of Ser. No. 783,065, filed Oct. 2, 1985, now abandoned, which is a continuation of Ser. No. 359,652, filed Mar. 9, 1984, now abandoned.

This invention relates to apparatus for dispersing a gas or vapor into the atmosphere under determined conditions.

Certain hormones, called pheromones, have been developed as an attractant for various flying insects, or insects which pass through a flying stage. There are also other attractants available either of similar scent to the pheromones, or of similar scent to a popular food source for particular species of flying insects. It is proposed to lure these flying insects by laying airborne trails of these pheromones or attractants, and to entrap and subsequently kill any flying insects so attracted. Hereinafter in the specification and claims the word "pheromone" is used to include also any other attractant available for the purposes stated, and also to include natural pheromones released by actual insects held in captivity.

The object of the present invention is to provide an apparatus for dispersing an airborne trail of a gaseous or vaporized pheromone into the atmosphere.

SUMMARY OF THE INVENTION

According to the present invention, there is provided an apparatus for dispersing a gaseous or vaporized pheromone into the atmosphere comprising a first housing within which at least one pheromone-releasing source holding means is located, the housing having at its top an outlet, upward-draft creating means provided on said first housing, which has, adjacent to or below each holding means, air-introducing means wherein the upward-draft creating means is mounted over the outlet and comprises a series of annular vanes, the uppermost and lowermost of which are parallel and of frusto-conical shape or substantially of frusto-conical shape, a central aperture in each said vane, a common axis about which the vanes are centered and arranged in predetermined vertical spaced relationship, a plurality of supports parallel to and radially spaced from said axis, the lowermost of said vanes converging inwardly towards the next upper vane which is usually horizontal and planar in a direction towards the common axis to form a venturi at their inner peripheries, but may have a frusto conical profile of a shallower angle than the uppermost and lowermost vanes, a device of aerodynamic shape mounted co-axially with the vanes and located between the upper two vanes, the device masking but not closing the central apertures in said vanes, and having upper and lower cone-like or dish-shaped air-deflecting walls arranged base-to-base about said common axis, the upper wall of the device being parallel or substantially parallel to the uppermost and lowermost vanes.

Preferably also, the first housing is an upright tube, the opening at the lower periphery of which is closable by a web provided in a second housing submounting the first housing, the air-introducing means being one or more air bleed holes provided in said web. Each pheromone source holding means is provided on the top of the web to extend into the first housing. A skirt extends peripherally around the first housing below the draft creating means and on top of which skirt a sticky insecticide is located to entrap and kill insects.

Preferably further, the second housing has a minor upper tubular portion integral with a major lower hollow frusto-conical portion in the bottom of the walls of which one or more cut-outs are provided.

Alternatively, the second housing is open-topped and may be closable by a lid centrally of which is provided the outlet over which the first housing with its means to create an upward draft is mounted, a tubular portion of the lid having the web thereacross being provided for engagement with said first housing and to hold said lid to said first housing. The second housing is of inverted truncated conical shape over the lower periphery of which a collecting bag is securable.

DESCRIPTION OF THE DRAWINGS

Embodiments of the present invention will now be described, by way of example, with reference to the accompanying drawings, in which.

DETAILED DESCRIPTION OF THE INVENTION

Figure 1:
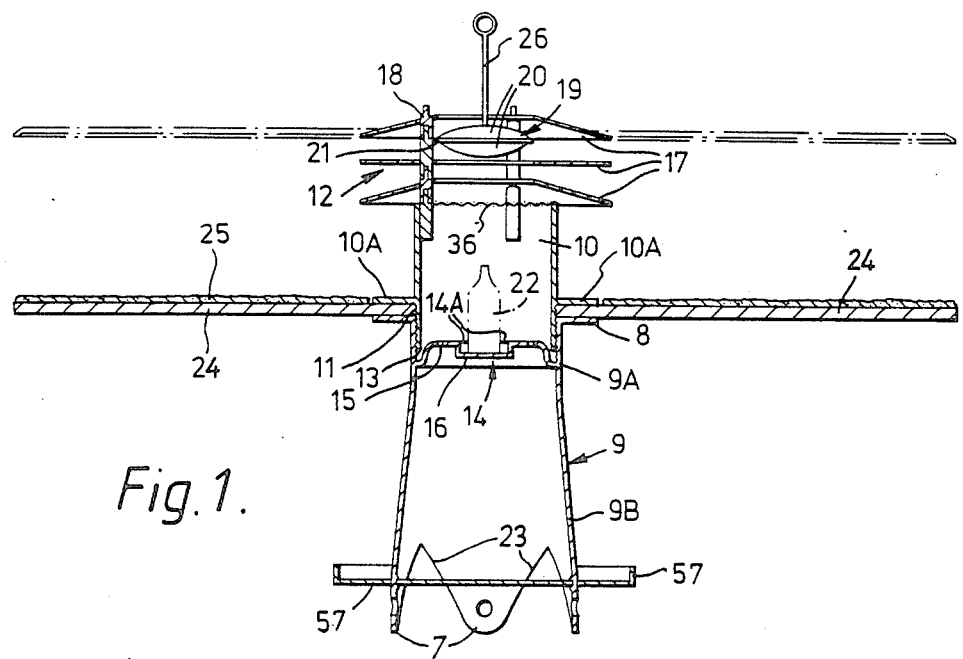
FIG. 1 is a vertical cross-sectional view of a first embodiment of an apparatus according to the present invention for dispersing a gaseous or vaporized pheromone into the atmosphere.
Figure 2:
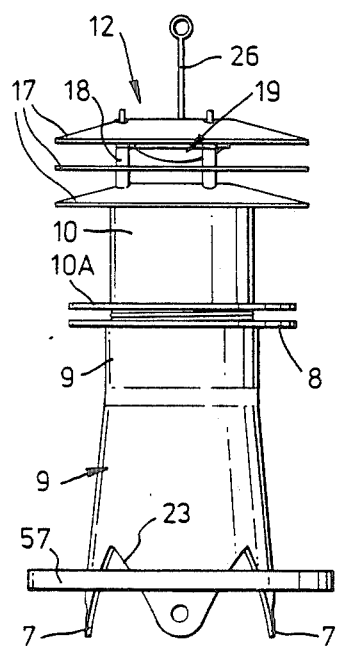
FIG. 2 is a side elevational view of the apparatus shown in FIG. 1 with a skirt removed for clarity.
Figure 4:
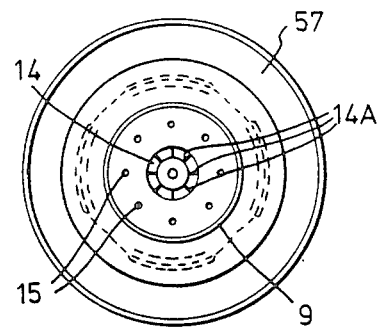
FIG. 4 is a plan view of a second housing of the apparatus shown in FIG. 1.

Referring to the drawings, a first embodiment of an apparatus for dispersing a gaseous or vaporized pheromone into the atmosphere comprises a first housing in the form of an upright tube 10 over the upper periphery (outlet) 11 of which means 12 to create an upward draft is mounted. The lower periphery 13 of the tube 10 is closed by a web 14 provided in a second housing 9 engageable with said first housing, the web 14 closing off the opening at the lower periphery. Air inlet means for the tube 10 is provided as a circular series of air bleed holes 15 spaced radially about the web 14. Pheromone-releasing source holding means is provided in the form of a recess 16 centrally of the web 14 with radial fingers 14A extending inwardly of said recess 16 to support a source therein. The bleed holes 15 are provided about the recess 16.

The tube 10 has a peripheral lip 10A extending outwardly adjacent to the bottom of the lower periphery and the outer side of the tube 10 between said lip 10A and the lower periphery is screw-threaded. The second housing 9 has a minor upper tubular portion 9A integral with a major lower hollow frusto-conical portion 9B. The inner face of the tubular portion 9A has an internal screw thread for engagement with the thread of the first housing 10. A lip 8 extends peripherally from around the top of the tubular portion 9A and extends to be in circumferential alignment with lip 10A.

The means 12 to create an upward draft comprises a vertically-spaced series of three annular vanes 17 centered on a common vertical axis. The vanes 17 are carried by a plurality of supports 18, such as three as shown, equi-spaced around the inner peripheries of the vanes 17. The longitudinal axes of the supports 18 are parallel to the common vertical axis of the vanes 17. The uppermost and lowermost vanes 17 are parallel and of frusto-conical shape, the angle to the horizontal being, for example between 10° and 15°. The intermediate vane 17 is usually horizontal and planar but may have a frusto conical profile of a shallower angle than the uppermost and lowermost vanes, and normal to the common vertical axis. Spaced between the top two adjacent vanes 17 a device 19 is provided secured to said supports 18 for masking but not closing, the central apertures in said vanes 17. This device 19 is of aerodynamic shape created by joining upper and lower cone-like, or dish shaped air-deflecting walls 20 arranged base-to-base about said common axis. Each wall 20 has a peripheral skirt 21, the skirt 21 extending radially into the space between the top and intermediate vanes 17 a short distance and affording mountings for the device 19 to be secured to the supports. The upper wall 20 is parallel or substantially parallel to the uppermost and lowermost vanes 17.

As air passes through the top of the trap, the vanes 17 direct it over the device 19 and this causes a drop in pressure above and below the device 19 (a venturi effect). The means 12 are secured to the first housing at the bottom of the supports 18. The pheromone-releasing sources are collars 22 impregnated with pheromone and which are filled one at a time into the recess 16, the impregnation of pheromone of the collars 22 being in such a way that gaseous or vaporized pheromone is given off from the collars 22 at a determined slow rate. The gaseous or vaporized pheromone is carried in a flow of air induced into the first housing 10 through holes 15 by suction created by air from the atmosphere passing through the means 12 and creating upward draft. The air carrying the gaseous or vaporized pheromone passes of of the outlet 11 and through the spaces between the top of the tube 10 and bottom vane 17 and between the bottom and intermediate vanes 17 and is carried as an airborn trail away from the apparatus. To prevent air flow (passing the bottom out the second housing 9) from creating a suction to prevent airflow through the holes 15, the bottom of the lower periphery of the second housing 9 is provided with a series of inverted V-cuts 23. A bottom plate 57 is fitted internally of and extending peripherally from said second housing 9 to define air entries at the top of the V-cuts 23, the bottom plate 57 serving to protect the air entries. These inverted V-cuts 23 create air turbulence thereby preventing suction. A skirt 24 extends peripherally around the first housing 10 held between lip 10A and lip 8 and is to support a tray 25 of sticky insecticide to entrap and kill flying insects. The remaining parts of the lower periphery of the second housing 9 between the V-cuts 23 can be used as feet 7 whereby the apparatus is self-supporting on a tabletop. Alternatively, the apparatus can be hung or suspended from a support either uprightly or invertedly by use of a hanger 26 having an eye at the upper end thereof or by use of cords threaded through eyes provided in the bottom of the feet 7 respectively.

Before use, one collar 22 is located in recess 16 and a tray 25 is located on the skirt 24. In use, the apparatus is preferably suspended uprightly by hanger 26 from a tree or other support, or rests self-supportedly on a tabletop. Gaseous or vaporized pheromone is released from the source and is carried by the air induced through the holes 15 as hereinbefore described and issues from the apparatus as an airborne trail. The type of pheromone chosen is to attract a particular flying insect and these insects fly along the trail to get to the source. They land on the tray 25 and are entrapped in the insecticide. The shape of the vanes 17 and the device 19 prevent downdrafts, wind to create downdrafts being deflected by said vanes 17 and the upper wall of the device 19, converted into laminar airflow. Due to the novel design of the draft creating means, airflow into the means from either the sides or the top of the trap is accelerated. This causes a reduction in pressure in accordance with the principals of Bernoulli's equation creating an updraft through the chimney formed by the first housing 10 and second housing 9.

In order to achieve a most effective venturi, the outlet areas defined by the draft creating means for exhaustion of air are such that the sum total thereof is equal to or greater than the area provided for airflow into the first housing 10 through holes 15.

The collar 22 is replaced as required. To prevent debris carried in the atmosphere from landing on the tray 25 and making the insecticide ineffective, an annular canopy 50 is provided to be secured to the uppermost vane 17 as shown.

Figure 3:
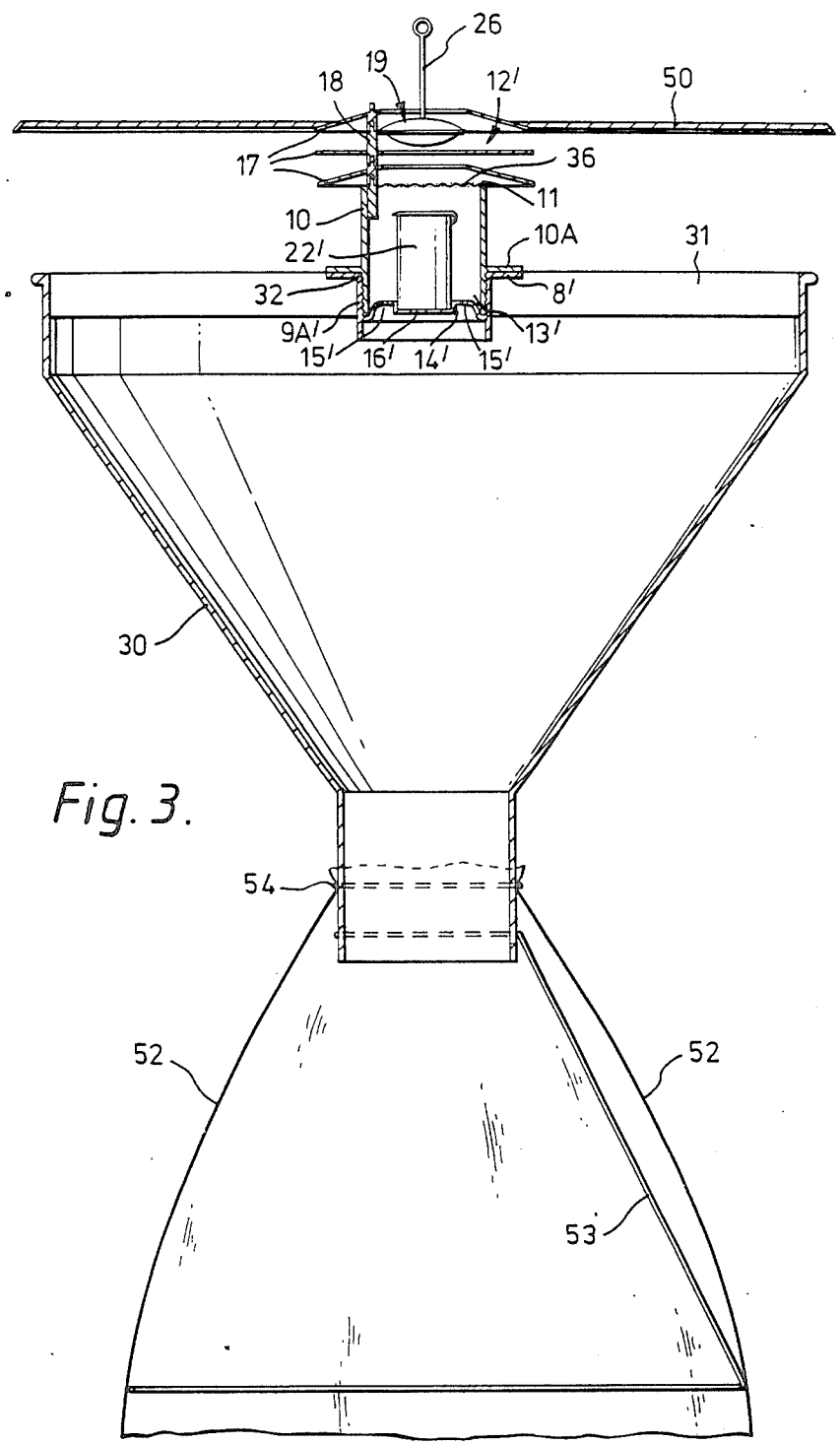
FIG. 3 is a vertical cross-sectional view of a second embodiment of an apparatus according to the present invention for dispersing a gaseous or vaporized pheromone into the atmosphere.
Figure 5:
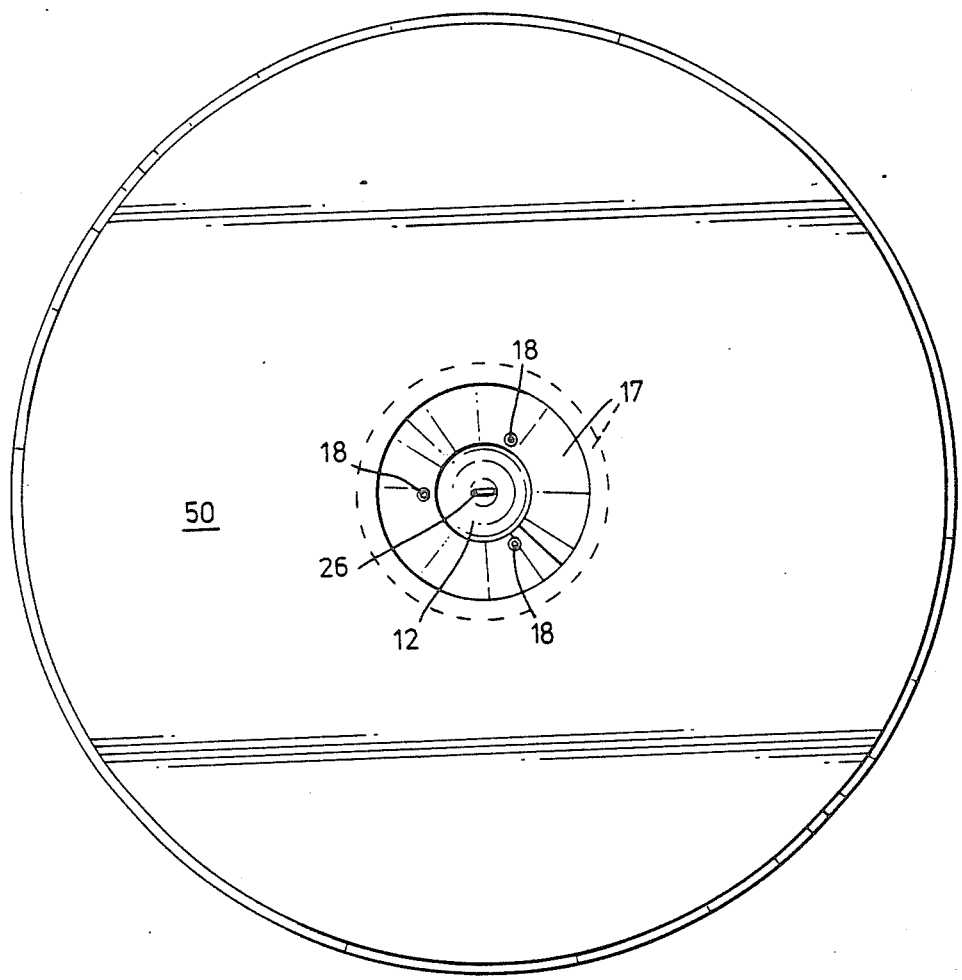
FIG. 5 is a plan view of the apparatus of both embodiments of the invention having an annular canopy secured to an uppermost vane of the apparatus.

In a second embodiment as shown in FIG. 3, in which like parts will be denoted by like numerals, a second housing 30 is open-topped, and is closable by a lid 31 with openings which has centrally thereof an outlet 32. The second housing 30 is of hollow inverted truncated-conical shape, the internal face of the wall of which is polished. The bottom of the second housing 30 is open and a water-tight collecting bag 52 is secured over the open bottom of the second housing 30 and held in position by an elastic band 54. A device 53 to hold the bag 52 open even in windy conditions is shown in FIG. 3. A tubular portion 9A' having the web 14' thereacross is provided for threaded engagement with said first housing 10 and to hold said lid 31 to said first housing 10. The portion 9A' has a lip 8'. A collar 22' is located in the recess 16'. Means 12' is provided as in the first embodiment. A liquid insecticide can be filled into the bag 52. As distinct from the first embodiment, the air for the upward draft being supplied through the lid openings, the apparatus of the second embodiment can only be suspended from a tree or other support and an airborne trail of pheromone issues from the apparatus in the same way as in the first embodiment. In this embodiment, the insects attracted by the pheromone crawl inside the second housing 30 through the lid openings and normally cannot escape and fall into or land in the bag 52.

If the pheromone source is to be obtained from a live insect, the top of the first housing 10 is covered with a gauze 36, and the housing 10 is of clear or opaque material.

What is claimed is:

1. Apparatus for dispersing a gaseous or vaporized pheromone into the atmosphere, comprising a first housing within which at least one pheromone-releasing source holding means is located, the housing having at its top and outlet, upward-draft creating means provided on said first housing which has adjacent to or below the, or each holding means, air introducing means, wherein the upward-draft creating means is mounted over the outlet, and comprises a series of annular vanes, the uppermost and lowermost of which are parallel and of frusto-conical shape or substantially of frusto-conical shape, a central aperture in each said vane, a common axis about which the vanes are centered and arranged in predetermined vertical spaced relationship, a plurality of supports parallel to and radially spaced from said axis, the lowermost of said vanes converging inwardly toward the next upper vane which is usually horizontal and planar in a diameter towards the common axis but may have a frusto-conical profile of shallower angle than the uppermost and lowermost vane forming a venturi, a device of aerodynamic shape mounted co-axially with the vanes and located between the upper two vanes, the device masking but not closing the central apertures in said vanes, and having upper and lower cone-like or dish-shaped air-deflecting walls arranged base-to-base about said common axis, the upper wall of the device being parallel or substantially parallel to the uppermost and lowermost vanes.

2. Apparatus according to claim 1, wherein the first housing is an upright tube, the opening at the lower periphery of which is closable by a web provided in a second housing submounting the first housing, the air introducing means being at least one air bleed hole provided in said web.

3. Apparatus according to claim 2, wherein the, or each holding means for the, or each pheromone-releasing source is provided on top of the web to extend into the first housing.

4. Apparatus according to claims 1, 2, 3, wherein a sticky-insecticide holding skirt extends peripherally around the first housing below the upward draft creating means.

5. Apparatus according to claim 2 or 3, wherein an annual canopy is provided around the uppermost vane.

6. Apparatus according to claim 1, 2, 3, wherein the second housing has a minor upper tubular portion integral with a major lower hollow frusto-conical portion in the bottom of the wall of which at least one cut-out is provided.

7. Apparatus according to claim 1 wherein the second housing is open-topped and closable by a lid centrally of which is provided the outlet over which the first housing with its upward-draft creating means is mounted, a tubular portion of the lid having a web thereacross being provided for engagement with said first housing and to hold said lid to said first housing.

8. Apparatus according to claim 7, wherein the second housing is of inverted truncated conical shape over the lower periphery of which a collecting bag is securable.

9. Apparatus according to claim 8, wherein a device is provided to support the bag in an extended state.

10. An apparatus for dispersing a gaseous or vapourized pheromone into the atmosphere, comprising a first housing within which at least one pheromone-releasing source holding means is located, the housing having at its top an outlet, upward-draft creating means provided on said first housing which has adjacent to or below the, or each holding means, air introducing means, wherein the upward-draft creating means is mounted over the outlet, and comprises a series of annular vanes, the uppermost and lowermost of which are parallel and of frusto-conical shape or substantially of frusto-conical shape, a central aperture in each said vane, a common axis about which the vanes are centered and arranged in predetermined vertical spaced relationship, a plurality of supports parallel to and radially spaced from said axis, the lowermost of said vanes converging inwardly towards the next upper vane which is horizontal and planar in a direction towards the common axis to form a venturi, a device of aerodynamic shape mounted co-axially with the vanes and located between the upper two vanes, the device masking but not closing the central apertures in said vanes, and having upper and lower cone-like or dish-shaped air-deflecting walls arranged base-to-base about said common axis, the upper wall of the device being parallel or substantially parallel to the uppermost and lowermost vanes.

11. An apparatus according to claim 10, wherein the first housing is an upright tube, the opening at the lower periphery of which is closable by a web provided in a second housing submounting the first housing, the air introducing means being at least one air bleed hole provided in said web.

12. An apparatus according to claim 11, wherein the, or each, holding means for the the, or each, pheromone-releasing source is provided on top of the web to extend into the first housing.

13. An apparatus according to claims 10, 11 or 12, wherein a sticky-insecticide holding skirt extends peripherally around the first housing below the upward draft creating means.

14. An apparatus according to claims 11 or 12, wherein an annual canopy is provided around the uppermost vane.

15. An apparatus according to claim 10, 11 or 12, wherein the second housing has a minor upper tubular portion integral with a major lower hollow frusto-conical portion in the bottom of the wall of which at least one cut-out is provided.

16. An apparatus according to claim 10, wherein the second housing is open-topped and closable by a lid centrally of which is provided the outlet over which the first housing with its upward-draft creating means is mounted, a tubular portion of the lid having a web thereacross being provided for engagement with said first housing and to hold said lid to said first housing.

17. An apparatus according to claim 16, wherein the second housing is of inverted truncated conical shape over the lower periphery of which a collecting bag is securable.

18. An apparatus according to claim 17, wherein a device is provided to support the bag in an extended state.

* * * * *